United States Patent
So et al.

(10) Patent No.: US 12,264,387 B2
(45) Date of Patent: Apr. 1, 2025

(54) STEEL PLATE HAVING EXCELLENT HEAT AFFECTED ZONE TOUGHNESS AND METHOD FOR MANUFACTURING THEREOF

(71) Applicant: POSCO, Pohang-si (KR)

(72) Inventors: Tae-Il So, Gwangyang-si (KR); Sang-Deok Kang, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 826 days.

(21) Appl. No.: 17/298,881

(22) PCT Filed: Nov. 29, 2019

(86) PCT No.: PCT/KR2019/016740
§ 371 (c)(1),
(2) Date: Jun. 1, 2021

(87) PCT Pub. No.: WO2020/111874
PCT Pub. Date: Jun. 4, 2020

(65) Prior Publication Data
US 2022/0127704 A1    Apr. 28, 2022

(30) Foreign Application Priority Data
Nov. 29, 2018    (KR) .................. 10-2018-0150705

(51) Int. Cl.
*C21D 8/02* (2006.01)
*B23K 9/16* (2006.01)
(Continued)

(52) U.S. Cl.
CPC ................ *C22C 38/14* (2013.01); *B23K 9/16* (2013.01); *C21D 8/0247* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C21D 2211/001* (2013.01);
(Continued)

(58) Field of Classification Search
None
See application file for complete search history.

(56) References Cited

U.S. PATENT DOCUMENTS

2016/0312327 A1    10/2016    Chimiya et al.
2017/0002435 A1    1/2017    Jeong et al.
(Continued)

FOREIGN PATENT DOCUMENTS

CN    103695776 A    4/2014
CN    106906414 A    6/2017
(Continued)

OTHER PUBLICATIONS

Machine translation of JP 2013-133476. (Year: 2013).*
(Continued)

*Primary Examiner* — Xiaowei Su
(74) *Attorney, Agent, or Firm* — Morgan, Lewis & Bockius LLP (57) ABSTRACT

The present invention relates to a steel plate which can appropriately be used as a structural material and the like. Provided are a steel plate, exhibiting excellent strength and toughness on a heat affected zone even when high heat input welding is performed, and a method for manufacturing thereof.

15 Claims, 3 Drawing Sheets

(a)

(b)

(51) Int. Cl.
    *C22C 38/00*    (2006.01)
    *C22C 38/02*    (2006.01)
    *C22C 38/04*    (2006.01)
    *C22C 38/06*    (2006.01)
    *C22C 38/08*    (2006.01)
    *C22C 38/12*    (2006.01)
    *C22C 38/14*    (2006.01)

(52) U.S. Cl.
    CPC .. *C21D 2211/002* (2013.01); *C21D 2211/005* (2013.01); *C21D 2211/008* (2013.01)

(56) References Cited

U.S. PATENT DOCUMENTS

| | | |
|---|---|---|
| 2018/0057906 A1 | 3/2018 | Ota et al. |
| 2018/0371587 A1 | 12/2018 | Yang et al. |
| 2019/0100818 A1 | 4/2019 | Kim et al. |
| 2019/0264306 A1 | 8/2019 | Kim et al. |

FOREIGN PATENT DOCUMENTS

| | | | | |
|---|---|---|---|---|
| CN | 108060348 A | * | 5/2018 | ........... C21D 8/0205 |
| EP | 1533392 A1 | | 5/2005 | |
| EP | 2949772 A1 | | 12/2015 | |
| JP | 2006-241510 A | | 9/2006 | |
| JP | 2008-156754 A | | 7/2008 | |
| JP | 4897126 B2 | | 3/2012 | |
| JP | 2013-133476 A | | 7/2013 | |
| KR | 10-2004-0040485 A | | 5/2004 | |
| KR | 10-2012-0067149 A | | 6/2012 | |
| KR | 10-2012-0071619 A | | 7/2012 | |
| KR | 10-2014-0083539 A | | 7/2014 | |
| KR | 10-2015-0075004 A | | 7/2015 | |
| KR | 10-2016-0078669 A | | 7/2016 | |
| KR | 10-2017-0128575 A | | 11/2017 | |
| KR | 10-2018-0053464 A | | 5/2018 | |

OTHER PUBLICATIONS

Machine translation of CN108060348A. (Year: 2018).*
Chinese Office Action dated Dec. 14, 2021 issued in Chinese Patent Application No. 201980076999.9 (with English translation).
Manfred Kodym, et al., "Trace elements in the steel—Possibilities for influencing in the melting process," Trace Elements in Steel, publishing company Stahleisen, Duesseldorf, Germany, Jan. 1, 1985, pp. 19-22 (Partial English translation).
Extended European Search Report dated Oct. 4, 2021 issued in European Patent Application No. 19889074.1.
International Search Report dated Jun. 22, 2020 issued in International Patent Application No. PCT/KR2019/016740 (with English translation).

* cited by examiner

STEEL PLATE HAVING EXCELLENT HEAT AFFECTED ZONE TOUGHNESS AND METHOD FOR MANUFACTURING THEREOF

CROSS-REFERENCE OF RELATED APPLICATIONS

This application is the U.S. National Phase under 35 U.S.C. § 371 of International Patent Application No. PCT/KR2019/016740, filed on Nov. 29, 2019, which in turn claims the benefit of Korean Application No. 10-2018-0150705, filed on Nov. 29, 2018, the entire disclosures of which applications are incorporated by reference herein.

TECHNICAL FIELD

The present disclosure relates to a steel material appropriate for a petrochemical material, a storage tank material, and the like, and more particularly, to a steel material having excellent weld zone toughness and a method for manufacturing the same.

BACKGROUND ART

In recent years, demand for a thick steel plate for use at a low temperature for refining and storing petroleum extracted from oil sands by-products such as ethylene and propylene produced during petrochemical processing is increasing in extremely cold areas such as North America and Canada.

In order to appropriately use the thick steel plate for use at a low temperature in structures such as (production?) facilities and storage tanks, it is essential to secure low temperature impact toughness in a heat affected zone (HAZ) as well as mechanical physical properties of a base metal. However, since a large amount of alloy elements are used in a high-strength steel material used in structures and the like for securing strength, it is difficult to secure the low temperature impact toughness of the heat affected zone.

In the heat affected zone (HAZ), toughness is decreased due to crystal grain coarsening, formation of an embrittled structure such as martensite-austenite constituent, precipitation hardening, and the like. Therefore, technologies for preventing a toughness decrease of the heat affected zone are in demand.

Meanwhile, in recent years, in order to improve constructability of structures and the like, a high heat input welding method such as electrogas welding (EGW) is increasingly used for a base metal, but in this case, the heat affected zone is deteriorated due to a high heat input capacity to greatly decrease strength and toughness as compared with a region welded by a common welding method.

A representative local embrittlement region is a coarse crystal grain heat affected zone in the vicinity of a fusion line (FL) and has poor toughness due to crystal grain coarsening, formation of upper bainite.

As a solution for the problems described above, Patent Document 1 suggests a technology of adding Mg or Ca to a steel for controlling a content of oxygen (O) in the steel and forming a Mg or Ca oxide to suppress austenite crystal grains and to be acted as a nucleation site of ferrite to suppress formation of grain boundary ferrite, thereby improving toughness of a heat affected zone.

However, when O in the steel forms an oxide with Mg or Ca and is not properly dispersed, it acts as an inclusion to greatly decrease the toughness of the heat affected zone.

Therefore, development of a technology of securing low temperature impact toughness of a heat affected zone as well as physical properties of a base metal well, in providing a thick steel plate for use at a low temperature which is appropriate as a material of structures and the like is in demand.

(Patent Document 1) Japanese Patent Laid-Open Publication No. 2006-241510

DISCLOSURE

Technical Problem

An aspect of the present disclosure is to provide a steel material which may be appropriately used as a material of structures and the like, that is, a steel material having excellent strength and toughness of a heat affected zone even in the case of performing high heat input welding and a method for manufacturing the same.

An object of the present disclosure is not limited to the above description. Other objects of the present invention are described in overall contents of the specification, and it will not difficult at all for a person with ordinary skill in the art to which the present disclosure pertains to understand the objects of the present disclosure from the descriptions of the specification of the present disclosure.

Technical Solution

According to an aspect of the present disclosure, a steel material having excellent heat affected zone toughness includes, by weight: 0.02 to 0.08% of carbon (C), 0.15 to 0.5% of silicon (Si), 1.2 to 1.8% of manganese (Mn), 0.008% or less (excluding 0%) of phosphorus (P), 0.003% or less (excluding 0%) of sulfur (S), 0.005 to 0.1% of aluminum (Al), 0.01 to 0.5% of nickel (Ni), 0.01 to 0.1% of molybdenum (Mo), 0.005 to 0.05% of niobium (Nb), 0.005 to 0.02% of titanium (Ti), and 20 to 100 ppm of nitrogen (N), with a balance of Fe and other unavoidable impurities, and satisfies the following Relation Formula 1, wherein a microstructure of a base metal includes, by area fraction, 20 to 60% of an acicular ferrite phase and 40 to 80% of a bainite phase, a microstructure of a fusion line in a heat affected zone after welding includes a ferrite phase and a bainite phase, and the steel material has a thickness of 10 to 40 mm:

$$0.42 > C + Mn/6 + (Cr+Mo+V)/5 + (Cu+Ni)/15 \quad \text{[Relation Formula 1]}$$

wherein each element means a weight content.

According to another aspect of the present disclosure, a method for manufacturing a steel material having excellent heat affected zone toughness includes: reheating a steel slab having an alloy composition described above and satisfying Relation 1 at 1050 to 1250° C.; roughly rolling the reheated steel slab in a temperature range of 1200 to Ar3+30° C.; after the rough rolling, finish-rolling the steel slab at a temperature higher than Ar3 to manufacture a hot rolled steel plate; and cooling the hot rolled steel plate down to room temperature to 550° C. at a cooling rate of 5° C./s or more.

Advantageous Effects

According to the present disclosure, a steel material having excellent strength and toughness in a heat affected zone as well as mechanical physical properties of a base metal may be provided.

The steel material of the present disclosure may be appropriately used as a material for structures such as a petrochemical manufacturing facility, a storage tank, and the like.

BEST MODE FOR INVENTION

The inventors of the present disclosure conducted extensive research for obtaining a steel material having excellent strength and toughness of a heat affected zone as well as mechanical physical properties of a base metal. As a result, it was confirmed that a steel material allowing a heat affected zone having excellent strength and toughness to be secured even by high heat input welding may be provided by optimizing manufacturing conditions together with an alloy composition of the steel material, thereby completing the present disclosure.

The "steel material" mentioned in the present disclosure may include not only a hot rolled steel plate manufactured by a series of processes but also a steel material having a weld zone (including a heat affected zone) formed by welding the hot rolled steel plate.

Hereinafter, the present disclosure will be described in detail.

The steel material having excellent heat affected zone toughness according to an aspect of the present disclosure may include, by weight: 0.02 to 0.08% of carbon (C), 0.15 to 0.5% of silicon (Si), 1.2 to 1.8% of manganese (Mn), 0.008% or less (excluding 0%) of phosphorus (P), 0.003% or less (excluding 0%) of sulfur (S), 0.005 to 0.1% of aluminum (Al), 0.01 to 0.5% of nickel (Ni), 0.01 to 0.1% of molybdenum (Mo), 0.005 to 0.05% of niobium (Nb), 0.005 to 0.02% of titanium (Ti), and 20 to 100 ppm of nitrogen (N).

Hereinafter, a reason why alloy components of the steel material for a pressure vessel provided by the present disclosure are controlled as described above will be described in detail. Herein, unless otherwise particularly stated, the content of each component is in % by weight.

Carbon (C): 0.02 to 0.08%

Carbon (C) is an element effective for improving strength of steel, and in order to sufficiently obtain the effect, it is preferable to include 0.02% or more of carbon. However, when the content is more than 0.08%, the low temperature impact toughness of a base metal and a weld zone are greatly decreased.

Therefore, in the present disclosure, C may be included at 0.02 to 0.08%, more advantageously at 0.04 to 0.07%.

Silicon (Si): 0.15 to 0.5%

Silicon (Si) is used as a deoxidizer and an element useful for improving strength and toughness of steel. When the content of Si is more than 0.5%, low temperature impact toughness and weldability may be rather poor, and thus, it is preferable to include 0.5% or less of Si. In addition, when the content of Si is less than 0.15%, a deoxidation effect may be insufficient.

Therefore, in the present disclosure, Si may be included at 0.15 to 0.5%, more advantageously at 0.15 to 0.4%.

Manganese (Mn): 1.2 to 1.8%

Manganese (Mn) is an element advantageous for securing strength by solid solution strengthening. In order to sufficiently obtain the effect, it is preferable to include 1.2% or more of Mn. However, when the content is more than 1.8%, manganese is bonded to sulfur (S) in steel to form MnS, thereby greatly decreasing an elongation at room temperature and low temperature impact toughness.

Therefore, in the present disclosure, Mn may be included at 1.2 to 1.8%, more advantageously at 1.3 to 1.7%

Phosphorus (P): 0.008% or less (excluding 0%)

Phosphorus (P) is advantageous in terms of strength improvement and corrosion resistance of steel, but may greatly decrease impact toughness, and thus, it is preferable to maintain the content to be as low as possible.

However, since excessive costs are required for controlling P at a very low content, it is preferable to limit the content to 0.008% or less.

Sulfur (S): 0.003% or less (excluding 0%)

Since sulfur (S) is bonded to Mn in steel to form MnS to greatly deteriorate impact toughness, it is preferable to maintain the content as low as possible.

Like P, since excessive costs are required for controlling S in a very low content, it is preferable to limit the content to 0.003% or less.

Aluminum (Al): 0.005 to 0.1%

Aluminum (Al) is an element for deoxidizing molten steel at a low cost, and in order to sufficiently obtain the effect, it is preferable to include Al at 0.005% or more. However, when the content is more than 0.1%, nozzle clogging is caused in continuous casting.

Therefore, in the present disclosure, Al may be included at 0.005 to 0.1%.

Nickel (Ni): 0.01 to 0.5%

Nickel (Ni) is an element advantageous for improving both strength and toughness of a base metal, and in order to sufficiently obtain the effect, nickel may be included at 0.01% or more. However, Ni is a high-priced element and when added at more than 0.5%, economic feasibility is greatly decreased.

Therefore, in the present disclosure, Ni may be included at 0.01 to 0.5%.

Molybdenum (Mo): 0.01 to 0.1%

Molybdenum (Mo) greatly improve hardenability only with addition in a small amount to suppress formation of a ferrite phase and also induce formation of a hard phase such as a bainite or martensite phase. In addition, since Mo may greatly improve strength, it is necessary to add 0.01% or more of Mo. However, Mo is a high-priced element and when excessively added, hardness of a weld zone may be excessively increased to deteriorate toughness, and thus, considering the fact, it is necessary to limit the content to 0.1% or less.

Therefore, in the present disclosure, Mo may be included at 0.01 to 0.1%.

Niobium (Nb): 0.005 to 0.05%

Niobium (Nb) is precipitated in the form of NbC or Nb(C,N) to greatly improve strength of a base metal and a weld zone, and also, when reheated at a high temperature, solid-solubilized Nb suppresses recrystallization of austenite and transformation of ferrite or bainite, thereby obtaining a structure refinement effect. In addition, since Nb increases stability of austenite even when cooling after rolling, production of a hard phase such as martensite or bainite is promoted even when cooled at a low rate to be useful for improving strength of a base metal. However, when a grain boundary ferrite phase is formed after welding a steel material, a coarse NbC carbide may be formed to deteriorate physical properties.

Therefore, in order to sufficiently obtain the effect described above, Nb may be included at 0.005% or more, but considering the aspect of securing weld zone impact toughness, Nb may be included at 0.05% or less.

Titanium (Ti): 0.005 to 0.02%

Titanium (Ti) is an element advantageous for suppressing crystal grain growth during reheating to greatly improve low temperature toughness. In order to sufficiently obtain the effect described above, it is preferable to include 0.005% or more of Ti, but when Ti is excessively added at more than 0.02%, low temperature impact toughness may be deteriorated due to nozzle clogging in continuous casting or center crystallization.

Therefore, in the present disclosure, Ti may be included at 0.005 to 0.02%.

Nitrogen (N): 20 to 100 ppm

Nitrogen (N) forms a TiN precipitate when added with Ti to suppress crystal grain growth by heat effect during welding. In order to obtain the effect described above, it is preferable to include 20 ppm or more of N, and when the content of N is controlled to less than 20 ppm, a steel making load is greatly increased and a crystal grain growth suppression effect is not sufficient. However, when the content of N is more than 100 ppm, AlN is formed to cause surface cracks.

Therefore, in the present disclosure, N may be included at 20 to 100 ppm.

For further improving the physical properties of the steel material of the present disclosure having the alloy composition described above, V may be further included as described later.

Vanadium (V): 0.01 to 0.1%

Vanadium (V) has a low solution solubilization temperature as compared with other alloy elements, and is precipitated in a heat affected zone to prevent drop in strength. Therefore, when securing strength after PWHT is not sufficient, 0.01% or more of vanadium may be added. However, when the content is more than 0.1%, a fraction of a hard phase such as MA is increased to deteriorate low temperature impact toughness of a weld zone.

Therefore, in the present disclosure, when added, V may be included at 0.01 to 0.1%.

A remaining component of the present disclosure is Fe. However, since in the common manufacturing process, unintended impurities may be inevitably incorporated from raw materials or the surrounding environment, they may not be excluded. Since these impurities are known to any person skilled in the common manufacturing process, the entire contents thereof are not particularly mentioned in the present specification.

Meanwhile, it is preferable that the steel material of the present disclosure having the alloy composition described above has a carbon equivalent (Ceq) of less than 0.42, the carbon equivalent being represented by the following Relation Formula 1.

When the carbon equivalent (Ceq) is 0.42 or more, toughness of a base metal and a heat affected zone may be poor, and a preheating temperature before welding is raised to increase manufacturing costs.

$$0.42>C+Mn/6+(Cr+Mo+V)/5+(Cu+Ni)/15 \quad \text{[Relation Formula 1]}$$

wherein each element means a weight content.

The steel material of the present disclosure having the alloy composition described above and a controlled Ceq value has a thickness of 10 to 40 mm and may include, by area fraction, 20 to 60% of an acicular ferrite phase and 40 to 80% of a bainite phase, as a microstructure.

The steel material of the present disclosure may have a low temperature structure as a microstructure to secure excellent strength and toughness.

When the acicular ferrite phase is less than 20% or the bainite phase is more than 80%, it is advantageous for securing strength but toughness may be deteriorated; however, when the acicular ferrite phase is more than 60% and the bainite phase is formed at less than 40%, it may be difficult to sufficiently secure strength.

Meanwhile, the steel material of the present disclosure may include a martensite phase (tempered martensite phase) at a constant fraction, except for the structures described above, and preferably, may include 10% or less (including 0%) of a martensite phase by area fraction.

Furthermore, the steel material of the present disclosure may be welded, and it is preferable that after the welding, a microstructure of a fusion line in a heat affected zone has ferrite and bainite phases.

That is, the steel material of the present disclosure may advantageously secure strength and toughness of a weld zone, by appropriately forming a soft phase and a hard phase with the microstructure of a fusion line after welding.

Here, though the fraction of each phase of the microstructure of the fusion line is not particularly limited, preferably, the ferrite phase may be included at 5 to 20% by area and a bainite phase may be included as a residual structure. The fusion line of the present disclosure may further include 5% or less (including 0%) of a MA phase except for the ferrite phase and the bainite phase.

In addition, the steel material of the present disclosure includes a carbonitride of the fusion line in a heat affected zone and a base metal, the carbonitride is in the form of MC or M(C,N), in which M is one or more of Mo and Ti, and it is preferable that Mo is 20% by weight or more.

The carbonitride is formed in the fusion line to prevent coarsening of austenite crystal grains, and thus, the heat affected zone has an austenite average crystal grain size of 500 μm or less.

The present disclosure may have the microstructure of the base metal as described above even after PWHT, and thus, a tensile strength is 450 MPa or more and also Charpy impact absorption energy at −50° C. is 200 J or more after PWHT so that strength and low temperature impact toughness are excellent.

In addition, in the present disclosure, by controlling the structure of the fusion line in the heat affected zone after welding as described above, a tensile strength is 450 MPa or more and Charpy impact absorption energy at −50° C. is 50 J or more before PWHT, while the tensile strength of the heat affected zone may be 450 MPa or more and the Charpy impact absorption energy at −50° C. may be 100 J or more, after PWHT.

Meanwhile, in the present disclosure, high heat input welding may be applied by the welding method, and as an example, an electrogas welding (EGW) method having a heat input capacity of 100 to 200 kJ/cm may be applied. The EGW method is a one-pass welding method, and is economically advantageous as compared with a common multi-pass welding method.

That is, a heat affected zone having excellent strength and toughness may be obtained from the steel material of the present disclosure, even when high heat input welding is applied.

Hereinafter, a method for manufacturing a steel material having excellent heat affected zone toughness according to another aspect of the present disclosure will be described in detail.

First, a steel slab satisfying the alloy composition described above and Relation Formula 1 is prepared, and may be subjected to a reheating process at 1050 to 1250° C.

When the reheating temperature of the steel slab is higher than 1250° C., austenite crystal grains are coarsened, so that a steel material having physical properties to be desired may not be obtained. However, when the temperature is lower than 1050° C., it is difficult to solid-solubilize carbonitrides produced in the slab again.

Therefore, in the present disclosure, the steel slab may be reheated at 1050 to 1250° C.

The steel slab which is reheated according to the above may be hot-rolled to be produced into a hot rolled steel plate. The hot rolling may be performed by undergoing rough rolling and finish rolling.

The rough rolling may be performed in a temperature range of 1200 to Ar3+30° C., and the finish rolling may be performed at a temperature of Ar3 or higher. During the rough rolling, when the temperature is lower than Ar3+30° C., the temperature in the subsequent finish rolling is lowered to less than Ar3, which may cause poor quality.

In the present disclosure, Ar3 may be represented as follows:

Ar3=910−310C−80Mn−20Cu−55Ni−80Mo+119V+124Ti−18Nb+179Al (wherein each element refers to a weight content).

According to the above description, the manufactured hot rolled steel plate may be cooled to a temperature range of room temperature to 550° C., in which cooling may be performed at a cooling rate of 5° C./s or more.

When the cooling rate in the cooling is less than 5° C./s, ferrite crystal grains may be coarsened and a packet size of upper bainite is increased, so that is may be difficult to secure physical properties to be desired. The upper limit of the cooling rate is not particularly limited, but cooling may be performed at 100° C./s or less, considering facility specification, a thickness of a hot rolled steel plate, and the like.

In addition, when a cooling end temperature is higher than 550° C., a pearlite or upper bainite phase may be formed to deteriorate strength and toughness.

Meanwhile, according to the above description, in performing cooling, the cooling may be initiated immediately after completing the finish hot rolling, and preferably the cooling may be initiated at 650° C. or higher. When the initiation temperature of the cooling is lower than 650° C., a ferrite fraction is excessively high, so that it is difficult to sufficiently secure strength. Therefore, the cooling may be initiated at 650° C. or higher, more advantageously at 740° C. or higher.

According to the description above, the hot rolled steel plate of the present disclosure after cooling may have a microstructure formed of 20 to 60% of acicular ferrite and 40 to 80% of bainite by area fraction, thereby securing sufficient strength. Here, 10% or less (including 0%) of a martensite phase may be included.

The microstructure of the hot rolled steel plate is maintained as it is even after the PWHT process performed after welding, but the bainite phase and the martensite phase may be transformed into a tempered bainite or tempered martensite phase.

The steel material manufactured by the series of processes described above may be welded, in which a heat input EGW process of a heat input capacity of 100 to 200 kJ/cm may be performed.

The microstructure of the fusion line in the heat affected zone formed after the heat input EGW may include ferrite and bainite. Here, the microstructure may include some MA phase, which is preferably included at 5% or less by area fraction.

The heat affected zone having the microstructure described above may secure a tensile strength of 450 MPa or more and Charpy impact absorption energy at −50° C. of 100 J or more even after a subsequent PWHT process.

In addition, after completing the welding, a post weld heat treatment (PWHT) process may be performed for removing residual stress, and the like.

The post weld heat treatment (PWHT) process conditions are not particularly limited, but may be performed in a temperature range of 590 to 620° C. for 60 minutes or more.

In general, strength and toughness of steel are deteriorated after a long-term PWHT process, but the steel material of the present disclosure does not have lowered strength and toughness of steel even after performing PWHT process as described above.

Specifically, the steel material (base metal) of the present disclosure may secure a tensile strength of 450 MPa or more and Charpy impact absorption energy at −50° C. of 200 J or more even after PWHT.

Hereinafter, the present disclosure will be specifically described through the following Examples. However, it should be noted that the following Examples are only for describing the present disclosure in detail by illustration, and not intended to limit the right scope of the present disclosure. The reason is that the right scope of the present disclosure is determined by the matters described in the claims and reasonably inferred therefrom.

MODE FOR INVENTION

Example 1

A steel slab having an alloy composition represented in the following Table 1 was reheated at 1120 to 1200° C. and then finish-rolled at 870° C. to manufacture each hot rolled steel plate. Thereafter, cooling of the hot rolled steel plate was initiated at 680 to 810° C. and the steel plate was cooled by water to 100 to 200° C. at a cooling rate of 5 to 70° C./s. Thereafter, the steel plate was subjected to a post weld heat treatment (PWHT) process in which the steel plate was maintained at 595° C. for 60 minutes and then was air-cooled. Here, the post weld heat treatment process was performed twice.

The manufacturing conditions depending on the thickness of each steel slab are shown in the following Table 2.

TABLE 1

| Classification | Alloy composition (wt %) | | | | | | | | | | | | |
|---|---|---|---|---|---|---|---|---|---|---|---|---|---|
| | C | Si | Mn | P* | S* | Al | Nb | Ni | Mo | V | Ti | N* | Relational |
| Inventive steel 1 | 0.055 | 0.211 | 1.542 | 61 | 16 | 0.033 | 0.007 | 0.460 | 0.075 | 0 | 0.0129 | 35 | 0.36 |
| Inventive steel 2 | 0.071 | 0.210 | 1.520 | 70 | 20 | 0.030 | 0.006 | 0.460 | 0.063 | 0 | 0.012 | 28 | 0.37 |
| Inventive steel 3 | 0.060 | 0.205 | 1.530 | 70 | 20 | 0.024 | 0.007 | 0.455 | 0.065 | 0.012 | 0.012 | 30 | 0.36 |
| Inventive steel 4 | 0.072 | 0.198 | 1.541 | 72 | 21 | 0.025 | 0.006 | 0.435 | 0.042 | 0 | 0.017 | 67 | 0.37 |
| Comparative steel 1 | 0.069 | 0.198 | 1.400 | 70 | 20 | 0.030 | 0.006 | 0.399 | 0 | 0 | 0.012 | 48 | 0.33 |
| Comparative steel 2 | 0.063 | 0.204 | 1.412 | 67 | 21 | 0.029 | 0.053 | 0.437 | 0 | 0 | 0.012 | 48 | 0.33 |

(In Table 1, P*, S*, and N* are in ppm.)

TABLE 2

| Thickness (mm) | Heating furnace extraction temperature (° C.) | Residual reduction ratio after rough rolling (%) | Finish rolling initiation temperature (° C.) | Finish rolling end temperature (° C.) | Cooling initiation temperature (° C.) | Cooling end temperature (° C.) | Cooling rate (° C./s) |
|---|---|---|---|---|---|---|---|
| 10 | 1200 | 85 | — (undesignated) | 870 | 680 | 200 | 70 |
| 15 | 1160 | 82 | 1000 | 870 | 740 | 200 | 60 |
| 20 | 1120 | 75 | 970 | 870 | 770 | 200 | 45 |
| 25 | 1120 | 70 | 950 | 870 | 780 | 200 | 28 |
| 30 | 1120 | 65 | 930 | 870 | 800 | 100 | 25 |
| 35 | 1120 | 60 | 930 | 870 | 810 | 100 | 17 |
| 40 | 1120 | 50 | 910 | 870 | 810 | 100 | 5 |

(In the case of a thickness of 10 mm, finish rolling was performed immediately after rough rolling without designation of the finish rolling initiation temperature.)

Thereafter, the microstructure of each steel material after the PWHT process was observed and mechanical physical properties were evaluated.

The microstructure was observed with an optical microscope, acicular ferrite, bainite, and martensite phases were visually distinguished using EBSD equipment, and each fraction was measured.

Then, the mechanical physical properties of the steel material corresponding to a thickness of 30 mm among the respective steel materials were measured, in which for a tensile specimen, a JIS No. 1 standard specimen was collected at a total thickness in a direction perpendicular to a rolling direction and a tensile strength (TS), a yield strength (YS), and an elongation (EI) were measured, and for an impact specimen, a JIS No. 4 standard specimen was collected at a ¼t point (wherein t is a thickness (mm) of a steel material) in a thickness direction perpendicular to a rolling direction and impact toughness (CVN) was measured, and the results are shown in the following Table 3. Here, each specimen was collected before and after PWHT, and a tensile test was performed for each specimen.

TABLE 3

| Classification | Thickness (mm) | Microstructure (% by area) | | |
|---|---|---|---|---|
| | | Acicular ferrite | Bainite | (Tempered) martensite |
| Inventive steel 1 | 10 | 24.1 | 67.1 | 8.8 |
| | 15 | 29.4 | 64.2 | 6.4 |
| | 20 | 35.5 | 60.3 | 4.2 |
| | 25 | 41.7 | 58.3 | 0 |
| | 30 | 48.5 | 51.5 | 0 |
| | 35 | 55.3 | 44.7 | 0 |
| | 40 | 59.7 | 40.3 | 0 |
| Inventive steel 2 | 10 | 22.8 | 68.0 | 9.2 |
| | 15 | 27.4 | 66.0 | 6.6 |
| | 20 | 33.7 | 62.0 | 4.3 |
| | 25 | 39.1 | 60.9 | 0 |
| | 30 | 47.3 | 52.7 | 0 |
| | 35 | 53.4 | 46.6 | 0 |
| | 40 | 57.0 | 43.0 | 0 |
| Inventive steel 3 | 10 | 24.2 | 67.2 | 8.6 |
| | 15 | 29.5 | 64.0 | 6.5 |
| | 20 | 35.8 | 60.3 | 3.9 |
| | 25 | 40.6 | 59.4 | 0 |
| | 30 | 47.7 | 52.3 | 0 |
| | 35 | 55.6 | 44.4 | 0 |
| | 40 | 58.6 | 41.4 | 0 |
| Inventive steel 4 | 10 | 22.8 | 67.7 | 9.5 |
| | 15 | 27.4 | 66.1 | 6.5 |
| | 20 | 33.7 | 62.3 | 4.0 |
| | 25 | 38.8 | 61.2 | 0 |
| | 30 | 46.7 | 53.3 | 0 |
| | 35 | 52.2 | 47.8 | 0 |
| | 40 | 58.6 | 41.4 | 0 |
| Comparative steel 1 | 10 | 26.3 | 69.5 | 4.2 |
| | 15 | 32.5 | 67.5 | 0 |
| | 20 | 36.8 | 63.2 | 0 |
| | 25 | 44.5 | 55.5 | 0 |
| | 30 | 49.8 | 50.2 | 0 |
| | 35 | 57.3 | 42.7 | 0 |
| | 40 | 63.9 | 36.1 | 0 |

TABLE 3-continued

| | | Microstructure (% by area) | | |
|---|---|---|---|---|
| Classification | Thickness (mm) | Acicular ferrite | Bainite | (Tempered) martensite |
| Comparative steel 2 | 10 | 18.2 | 70.6 | 11.2 |
| | 15 | 24.2 | 67.4 | 8.4 |
| | 20 | 28.9 | 64.6 | 6.5 |
| | 25 | 33.5 | 63.0 | 3.5 |
| | 30 | 41.2 | 58.8 | 0 |
| | 35 | 44.5 | 55.5 | 0 |
| | 40 | 49.2 | 50.8 | 0 |

TABLE 4

| | Before PWHT | | | | After PWHT | | | |
|---|---|---|---|---|---|---|---|---|
| Classification | YS (MPa) | TS (MPa) | El (%) | CVN (−50° C., J) | YS (MPa) | TS (MPa) | El (%) | CVN (−50° C., J) |
| Inventive steel 1 | 430 | 594 | 52 | 351 | 432 | 517 | 59 | 437 |
| Inventive steel 2 | 453 | 665 | 27 | 294 | 431 | 532 | 32 | 231 |
| Inventive steel 3 | 447 | 651 | 25 | 346 | 425 | 519 | 35 | 412 |
| Inventive steel 4 | 441 | 645 | 27 | 243 | 418 | 512 | 34 | 315 |
| Comparative steel 1 | 347 | 546 | 25 | 221 | 381 | 478 | 36 | 316 |
| Comparative steel 2 | 475 | 683 | 35 | 304 | 466 | 548 | 34 | 310 |

As shown in the above Tables 3 and 4, the microstructure by thickness of the steel material manufactured by the alloy composition and the manufacturing conditions suggested in the present disclosure was confirmed. Specifically, since the acicular ferrite phase and the bainite phase were appropriately formed at an intended fraction regardless of the thickness of the steel material, it was confirmed that there was almost no deterioration of strength and impact toughness even after PWHT.

However, it was confirmed that Comparative steel 1 having an alloy composition which does not satisfy the present disclosure had rather low strength and toughness as compared with the inventive steels before PWHT. That is, Comparative steel 1 did not produce a Mo-based carbide in a matrix by not adding Mo, thereby having poor strength and toughness after PWHT.

Meanwhile, Comparative steel 2 had similar strength and toughness of a base metal to those of inventive steels by excessively adding Nb, but heat affected zone impact toughness was poor as confirmed in the following. This may be considered to be due to the fact that a TiNbCN carbonitride was formed by excessively added Nb to have poor toughness after welding and Nb induces grain boundary ferrite formation to adversely affect toughness after welding.

Figure 1:
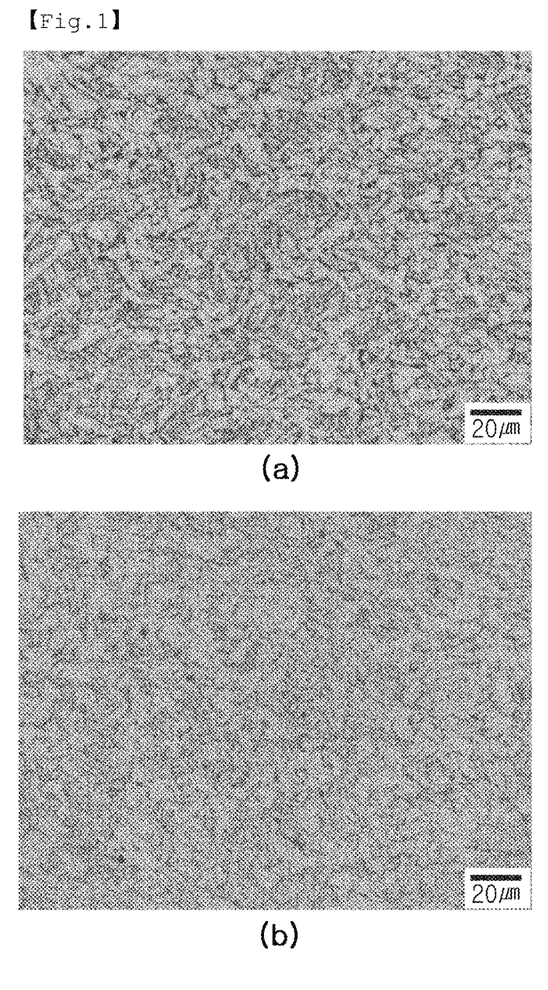
FIG. 1 is photographs of a microstructure observed before and after a post weld heat treatment (PWHT) of Inventive steel 1 according to an exemplary embodiment of the present disclosure.

As shown in FIG. 1, it is confirmed that in Inventive steel 1, acicular ferrite and bainite were mixed before performing PWHT and acicular ferrite and tempered bainite were produced by a tempering effect after PWHT.

Example 2

Each hot rolled steel plate manufactured by subjecting steel slabs having alloy compositions of Table 1 to a [reheating—hot rolling—cooling] process as described in Example 1 was subjected to one-pass high heat input welding (EGW) at a heat input capacity of 170 kJ/cm to form a heat affected zone. Thereafter, the steel plate was subjected to a post weld heat treatment process in which the steel plate was maintained at 595° C. for 60 minutes and then was air-cooled. Here, the post weld heat treatment process was performed twice.

Thereafter, a microstructure of a fusion line (FL) in the heat affected zone of a steel material corresponding to a thickness of 30 mm among the respective steel materials after the PWHT process was observed and mechanical physical properties were evaluated.

The microstructure of the fusion line (FL) was observed by an optical microscope, ferrite, bainite, and hard phases (MA phase) were visually distinguished by EBSD equipment, each fraction was measured, and the results are shown in the following Table 5. In addition, an austenite average crystal grain size of the fusion line (FL) was measured, and the results are shown together.

Then, a specimen of the fusion line (FL) in the heat affected zone was collected, and a tensile strength (TS), a yield strength (YS), an elongation (El), and an impact toughness (CVN) were measured. In addition, each specimen was collected also in FL+1, FL+3, and FL+5 regions and impact toughness (CVN) was measured, and the results are shown in the following Table 6 (wherein +1, +3, and +5 regions refer to points 1 mm, 3 mm, and 5 mm away, respectively in a base metal direction based on a fusion line). Here, the impact toughness (CVN) was measured by collecting each specimen before and after PWHT and then performing evaluation for each specimen.

TABLE 5

| | AGS | Microstructure (% by fraction) | | |
|---|---|---|---|---|
| Classification | (μm) | Ferrite | Bainite | Hard phase (MA) |
| Inventive steel 1 | 258 | 10.4 | 86.5 | 3.1 |
| Inventive steel 2 | 241 | 10.9 | 85.8 | 3.3 |
| Inventive steel 3 | 267 | 12.9 | 84.2 | 2.9 |
| Inventive steel 4 | 159 | 10.8 | 86.7 | 2.5 |
| Comparative steel 1 | 245 | 8.1 | 88.7 | 3.2 |
| Comparative steel 2 | 231 | 11.4 | 83.2 | 5.4 |

TABLE 6

| Classification | YS (MPa) | TS (MPa) | El (%) | CVN before PWHT (−50° C., J) | | | | CVN after PWHT (−50° C., J) | | | |
|---|---|---|---|---|---|---|---|---|---|---|---|
| | | | | FL | FL + 1 | FL + 3 | FL + 5 | FL | FL + 1 | FL + 3 | FL + 5 |
| Inventive steel 1 | 354 | 512 | 22 | 53 | 97 | 281 | 398 | 104 | 165 | 385 | 422 |
| Inventive steel 2 | 368 | 531 | 20 | 69 | 174 | 165 | 201 | 116 | 188 | 211 | 245 |
| Inventive steel 3 | 356 | 516 | 20 | 50 | 51 | 180 | 202 | 102 | 145 | 265 | 407 |
| Inventive steel 4 | 394 | 505 | 24 | 87 | 161 | 168 | 250 | 133 | 208 | 214 | 301 |
| Comparative steel 1 | 343 | 470 | 23 | 42 | 111 | 167 | 195 | 84 | 122 | 196 | 309 |
| Comparative steel 2 | 389 | 563 | 24 | 21 | 49 | 114 | 189 | 65 | 97 | 164 | 321 |

As shown in the above Tables 5 and 6, the microstructure of the fusion line (FL) in the heat affected zone obtained by welding the steel material manufactured by the alloy composition and the manufacturing conditions suggested in the present disclosure by the EGW method was confirmed. Specifically, since in Inventive steels 1 to 4, a soft phase and a hard phase were appropriately formed by the structure of the fusion line, it was confirmed that there was almost no deterioration of strength and impact toughness even after PWHT.

However, it was confirmed that Comparative steels 1 and 2 having alloy compositions which did not satisfy the present disclosure had poor impact toughness after PWHT of the fusion line in the heat affected zone.

Figure 2:
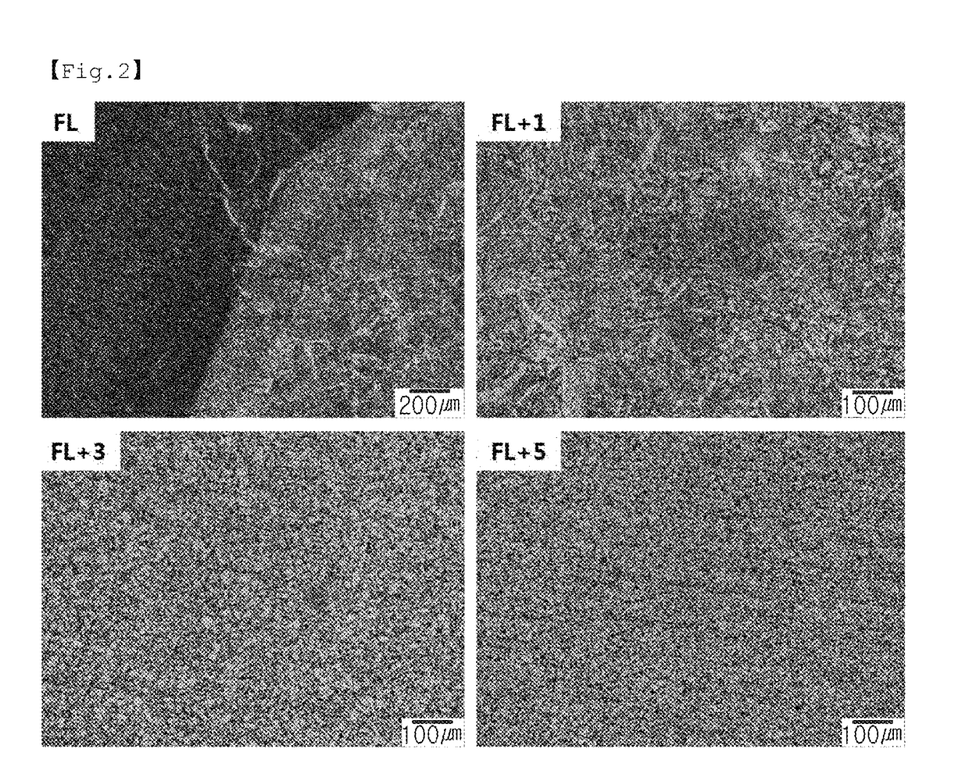
FIG. 2 is photographs of microstructures in fusion line (FL), FL+1, FL+3, and FL+5 regions observed after welding Inventive steel 4 according to an exemplary embodiment of the present disclosure by an EGW method.

FIG. 2 is photographs of microstructures in FL, FL+1, FL+3, and FL+5 regions of Inventive steel 4, in which in FL and FL+1 regions, bainite and some grain boundary ferrite were observed and in FL+3 and FL+5 regions, there were fine and uniform polygonal ferrite structure.

Figure 3:
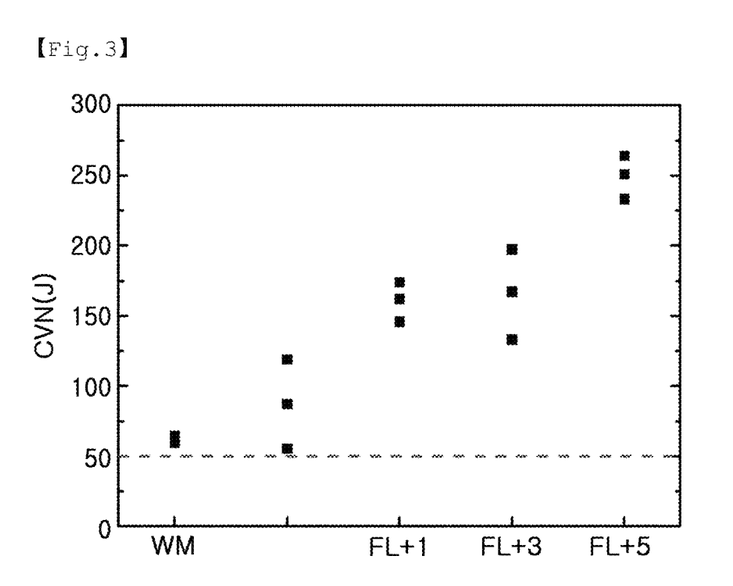
FIG. 3 is a graph representing results (results of measurement three times for each position) of measuring low temperature impact toughness (−50° C.) in welded metal (WM), fusion line (FL), FL+1, FL+3, and FL+5 regions observed after welding Inventive steel 4 according to an exemplary embodiment of the present invention by an EGW method.

In addition, as shown in FIG. 3, it is confirmed that Inventive steel 4 secured impact toughness of the fusion line in the heat affected zone and the base metal of 50 J or more in all regions (FL, FL+1, FL+3, and FL+5) after PWHT.

The invention claimed is:

1. A steel material, comprising, by weight:
0.02 to 0.08% of carbon (C),
0.15 to 0.5% of silicon (Si),
1.2 to 1.8% of manganese (Mn),
0.008% or less, excluding 0%, of phosphorus (P),
0.003% or less, excluding 0%, of sulfur(S),
0.005 to 0.1% of aluminum (Al),
0.01 to 0.5% of nickel (Ni),
0.01 to 0.1% of molybdenum (Mo),
0.005 to 0.05% of niobium (Nb),
0.005 to 0.02% of titanium (Ti),
20 to 100 ppm of nitrogen (N), and
a balance of Fe and other unavoidable impurities,
wherein the steel material satisfies the following Relation Formula 1,
wherein a microstructure of a base metal includes 20 to 60% of an acicular ferrite phase and 40 to 80% of a bainite phase by area fraction,
wherein a microstructure of a fusion line in a heat affected zone after welding includes a ferrite phase in 5 to 20% by area and a bainite phase as a remainder, and
wherein the steel material has a thickness of 10 to 40 mm:

$$0.42 > C + Mn/6 + (Cr + Mo + V)/5 + (Cu + Ni)/15 \quad \text{[Relation Formula 1]}$$

wherein each element means a weight content.

2. The steel material of claim 1, further comprising: 0.01 to 0.1% by weight of vanadium (V).

3. The steel material of claim 1, wherein
the base metal and the fusion line in the heat affected zone include a carbonitride, and
the carbonitride is in a form of MC or M(C,N), in which M is 20% by weight or more of Mo and a balance of Ti.

4. The steel material of claim 1, wherein the heat affected zone has an austenite average crystal grain size of 500 μm or less.

5. The steel material of claim 1, wherein the base metal includes a martensite phase or a tempered martensite phase at 10% or less, including 0%, by area fraction.

6. The steel material of claim 1, wherein the steel material has a tensile strength of 450 MPa or more and Charpy impact absorption energy at −50° C. of 200 J or more after post weld heat treatment (PWHT).

7. The steel material of claim 1, wherein the heat affected zone has a tensile strength of 450 MPa or more and Charpy impact absorption energy at −50° C. of 100 J or more after post weld heat treatment (PWHT).

8. The steel material of claim 1, wherein the welding is electrogas welding (EGW) and is a high heat input welding method of a heat input capacity of 100 to 200 kJ/cm.

9. The steel material of claim 1, comprising, by weight, 0.055 to 0.08% of carbon (C).

10. The steel material of claim 1, wherein the microstructure of the fusion line further includes a martensite austenite (MA) phase.

11. A method for manufacturing the steel material of claim 1, the method comprising:
reheating a steel slab at 1050 to 1250° C., the steel slab including, by weight: 0.02 to 0.08% of carbon (C), 0.15 to 0.5% of silicon (Si), 1.2 to 1.8% of manganese (Mn), 0.008% or less, excluding 0%, of phosphorus (P), 0.003% or less, excluding 0% of sulfur(S), 0.005 to 0.1% of aluminum (Al), 0.01 to 0.5% of nickel (Ni), 0.01 to 0.1% of molybdenum (Mo), 0.005 to 0.05% of niobium (Nb), 0.005 to 0.02% of titanium (Ti), and 20 to 100 ppm of nitrogen (N), with a balance of Fe and other unavoidable impurities, and satisfying the following Relation Formula 1;
roughly rolling the reheated steel slab in a temperature range of 1200 to Ar3+30° C.;
after the rough rolling, finish-rolling the steel slab at a temperature of Ar3 or higher to manufacture a hot rolled steel plate; and
cooling the hot rolled steel plate down to room temperature to 200° C. at a cooling rate of 5° C./s or more:

$$0.42 > C + Mn/6 + (Cr + Mo + V)/5 + (Cu + Ni)/15 \quad \text{[Relation Formula 1]}$$

wherein each element means a weight content.

12. The method of claim 11, wherein the steel slab further includes 0.01 to 0.1% of vanadium (V).

13. The method of claim 11, further comprising: subjecting the cooled hot rolled steel plate to an electrogas welding (EGW) process at a heat input capacity of 100 to 200 kJ/cm.

14. The method of claim 13, wherein a microstructure of a fusion line in the heat affected zone formed after the electrogas welding (EGW) includes 5 to 20% by area of ferrite phase and a bainite phase as a reminder.

15. The method of claim 13, further comprising: after the electrogas welding (EGW) process, performing a post weld heat treatment (PWHT) in a temperature range of 590 to 620° C.

* * * * *